Dec. 9, 1952 R. E. BRADLEY 2,620,613
POWER-DRIVEN LAWN MOWER
Filed May 29, 1946 6 Sheets-Sheet 2

INVENTOR.
ROBERT E. BRADLEY
BY
Carroll R. Tober

Dec. 9, 1952 R. E. BRADLEY 2,620,613
POWER-DRIVEN LAWN MOWER
Filed May 29, 1946 6 Sheets-Sheet 3

INVENTOR.
ROBERT E. BRADLEY
BY
*Carroll R. Taber*

Dec. 9, 1952   R. E. BRADLEY   2,620,613
POWER-DRIVEN LAWN MOWER
Filed May 29, 1946   6 Sheets-Sheet 4

INVENTOR.
ROBERT E. BRADLEY
BY
Carroll R. Taber

Dec. 9, 1952 R. E. BRADLEY 2,620,613
POWER-DRIVEN LAWN MOWER
Filed May 29, 1946 6 Sheets-Sheet 6

INVENTOR.
ROBERT E. BRADLEY
BY
Carroll R. Faber

Patented Dec. 9, 1952

2,620,613

UNITED STATES PATENT OFFICE 2,620,613

POWER-DRIVEN LAWN MOWER

Robert E. Bradley, East Lansing, Mich., assignor to Reo Motors, Inc., Lansing, Mich., a corporation of Michigan Application May 29, 1946, Serial No. 673,064

9 Claims. (Cl. 56—26)

This invention relates to lawn mowers and more particularly to power driven lawn mowers.

The principal object of the invention is to provide a lawn mower in which means is provided for driving the traction wheels and rotary cutter and in which either the traction wheels or rotary cutter may be selectively controlled by the operator.

Another object of the invention is to provide such a lawn mower in which a novel means is provided for elevating the cutter from the ground.

These objects will more fully appear in the following specification, when read in connection with the accompanying drawings, wherein.

The lawn mower embodying the invention comprises generally a main frame 10, a cutter frame 11 pivotally connected to the main frame by means which will be presently described, and a motor 12.

Figure 5:
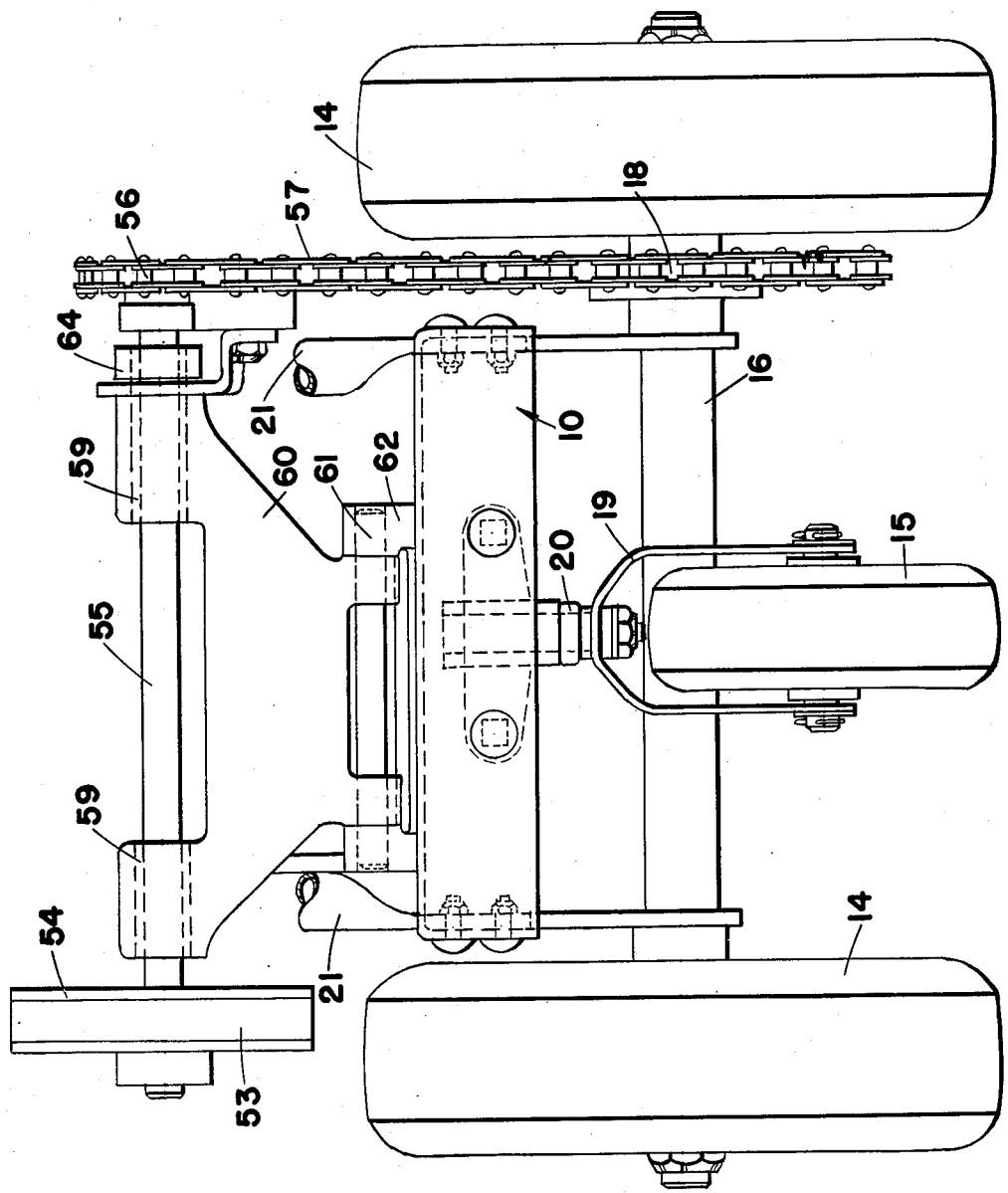
Figure 5 is a rear elevational view of a portion of the lawn mower.
Figure 8:
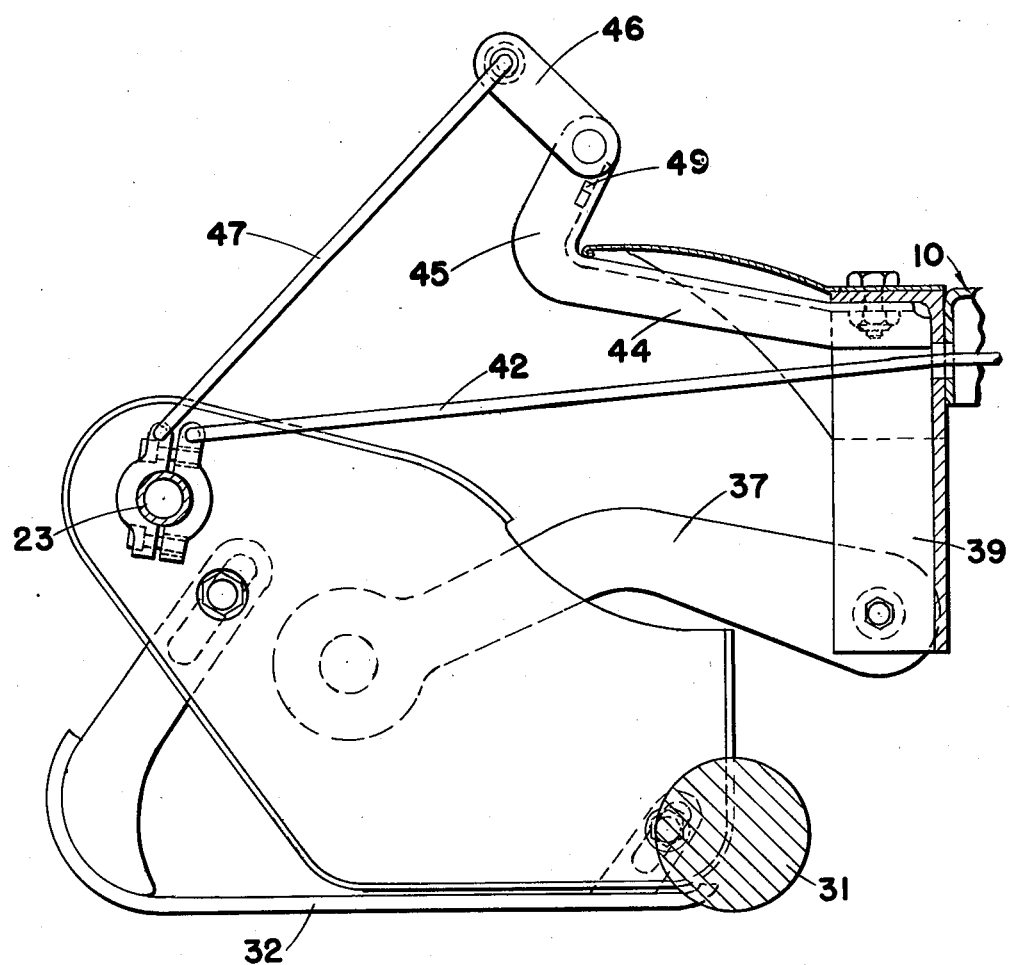
Figure 8 is a fragmentary side elevational view showing the arrangement for elevating and holding the cutter frame in raised position.

The main frame comprises a platform 13 which may be of any suitable construction. Preferably it comprises a pair of generally parallel side members and two or more transverse members, all rigidly attached together. The main frame is supported by a pair of traction wheels 14 and a caster wheel 15. The traction wheels 14 are mounted on a transverse shaft 16 which is rotatably mounted in bearings in depending supports 17. The latter are bolted or otherwise securely attached to side members of the frame. The shaft 16 on the right hand side of the frame, as viewed in Figure 5, is provided with a sprocket 18 for driving the wheels, as will be explained presently.

The caster wheel 15 is mounted in a bifurcated support 19 which is rotatably received in a bearing 20 attached to the rear end of the main frame.

Figure 1:
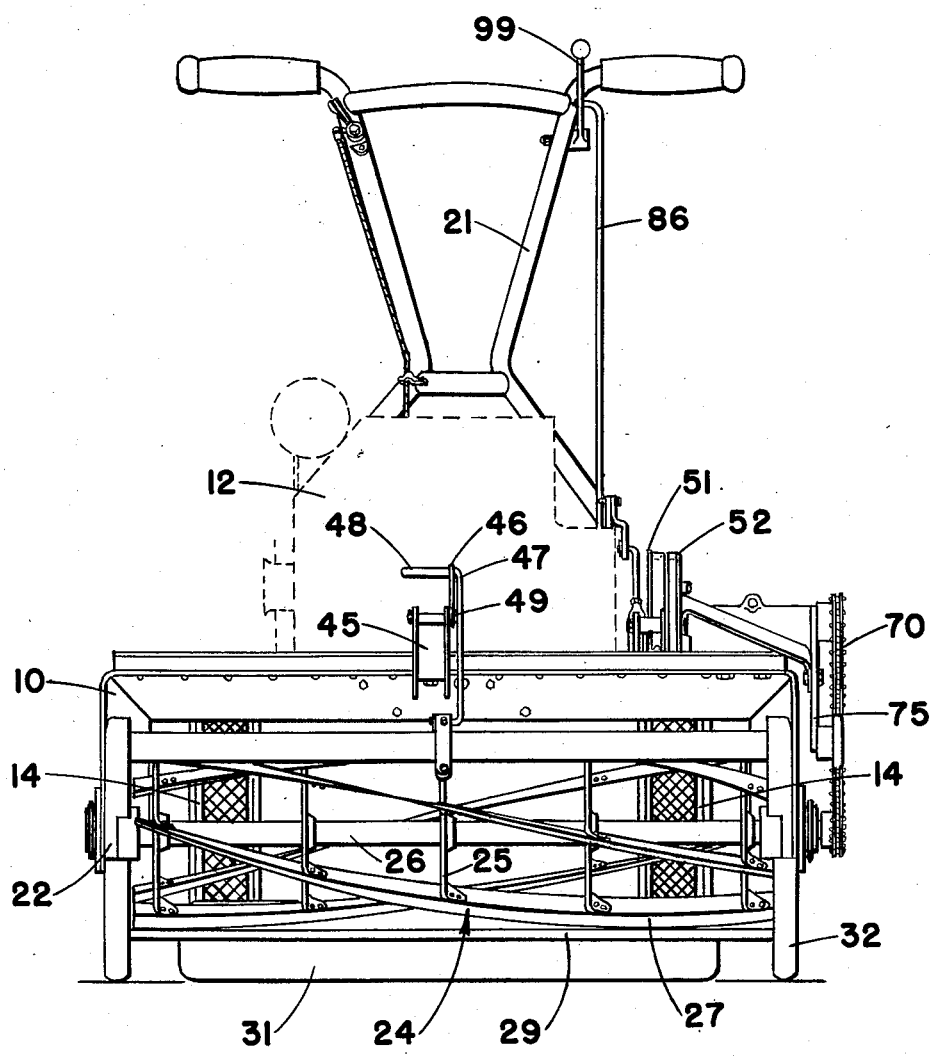
Figure 1 is a front elevational view of a lawn mower embodying the present invention.

A handle 21 is securely attached to the main frame adjacent the rear end thereof and inclines upwardly and rearwardly therefrom. Preferably the handle is formed of a plurality of tubes welded together to the configuration shown in Figure 1.

Figure 2:
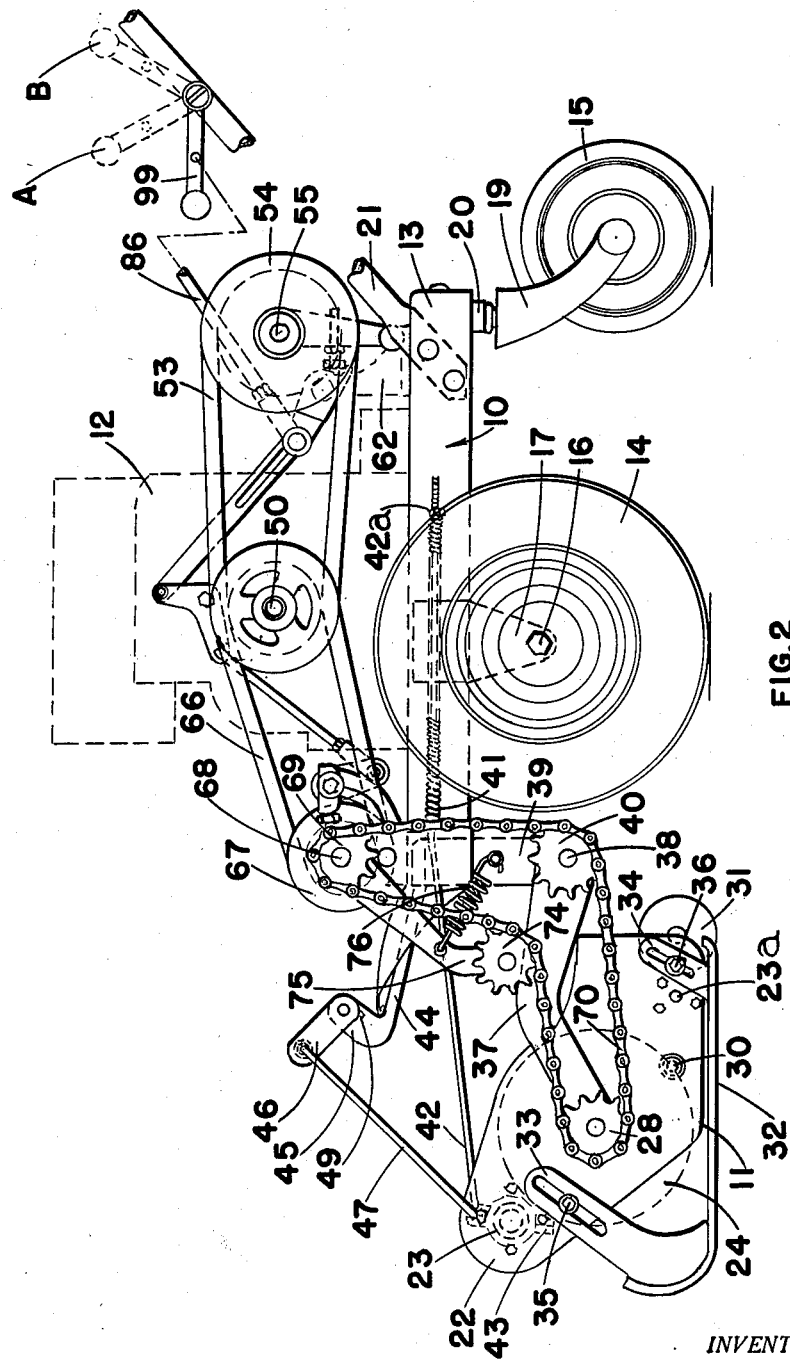
Figure 2 is a side elevational view of the same, a part of the handle being broken away.
Figure 6:
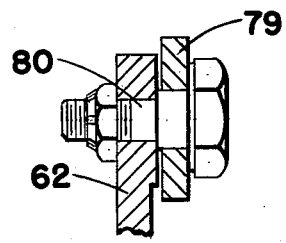
Figure 6 is a fragmentary cross-sectional view taken on substantially the line 6—6 of Figure 4.
Figure 7:
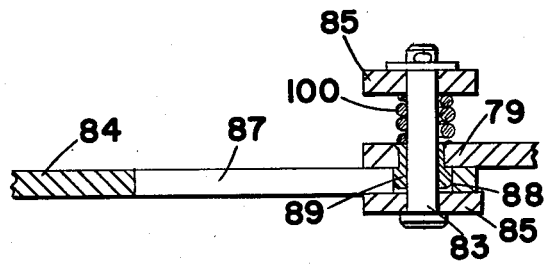
Figure 7 is a fragmentary cross-sectional view taken on substantially the line 7—7 of Figure 4.
Figure 3:
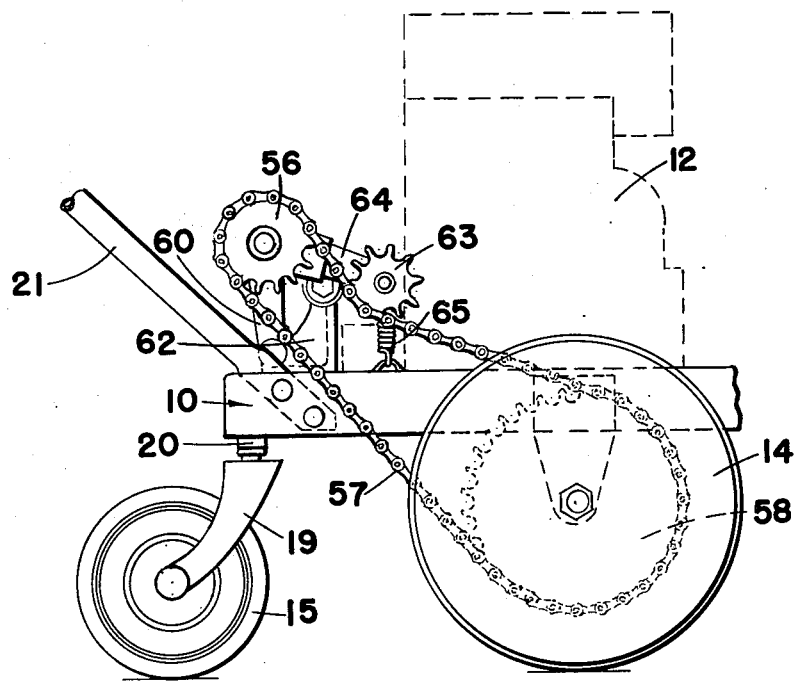
Figure 3 is a fragmentary side elevational view taken from the side of the mower opposite that of Figure 2.

The cutter frame is mounted ahead of the main frame in spaced relation thereto, as disclosed in Figure 2. The cutter frame comprises a pair of laterally spaced apart side frame members 22 which are rigidly secured together by a pair of transverse struts 23 and 23a. A rotary cutter or reel 24 is also mounted between the side frame members 22 and rotates therein. The reel comprises a plurality of laterally spaced spiders 25 welded or otherwise secured to a cutter shaft 26. The spiders 25 are provided with a plurality of fly knives 27 attached adjacent the peripheries of the spiders. The ends of the shaft 26 rotate in suitable bearings in the side frame members. The left hand end of the shaft 26 extends through the adjacent side frame member a substantial distance and has a sprocket 28 firmly attached thereto.

A ledger blade 29 is mounted on the side frame members on transverse pivots 30. The ledger blade may be rocked a limited amount around the pivots 30 in order to adjust the relative positions of the fly knives and the ledger blade. Any suitable form of adjustment for this movement of the ledger blade may be provided.

A ground engaging roller 31 is rotatably mounted adjacent the rear of the cutter frame and supports the rear part of the cutter frame from the ground. The roller 31 may be provided with a suitable adjustment relative to the cutter frame so as to permit variation of the height of cut of the cutter. The adjusting means is preferably the same as the means for adjusting the roller disclosed in the aforesaid copending application.

A pair of sliding shoes 32 are attached to the respective side frame members 22. Each shoe has upwardly and rearwardly inclined arms 33 and 34. These arms are slotted as indicated and are attached to the respective side frame members by clamping bolts 35 and 36. As will be evident, the position of the shoes 32 can be adjusted by loosening the clamping bolts and retightening the same after the required adjustment has been effected.

The cutter frame is held in properly spaced relation to the main frame while at the same time it is permitted to move vertically relative to the main frame by means of a pair of arms 37. These arms are of the configuration shown in Figure 2. Each end of each of the arms 37 is provided with a bearing. The front bearing in each arm receives the shaft 26 and is rotatable thereon. Preferably the bearings which receive the shaft 26 are mounted in the ends of the arms 37 so as to permit a limited amount of universal movement between them.

The rear ends of the arms 37 are also provided with bearings which are mounted on a shaft 38. This shaft is fastened to a pair of depending supports 39 which are rigidly attached to the main frame at its forward end. The shaft 38 may rotate relative to the supports 39 but it is preferred to fix the shaft on the supports and rotate the arms 37 relative to the shaft. A sprocket 40 is rotatably mounted on the left hand end of the shaft 38.

The cutter frame is counterbalanced by means of a spring 41 and a rod 42. The rod 42 passes through an opening in the front cross member of the main frame. The front end of rod 42 is pivotally connected to the transverse member 23 on the cutter frame by means of a bracket 43 which is fixedly clamped thereon. The spring 41 surrounds the rod 42 and is compressed between the front cross member of the frame and a washer and nut 42a on the rear end of the rod 42. The compression of the spring can be adjusted by the nut 42a so as to have a tendency to lift the weight of the cutter frame from the ground.

Rigidly attached to the front end of the main frame adjacent its transverse center and extending forwardly therefrom is a carrying arm 44. This arm is provided adjacent its front end with an upstanding extension 45. An abutment 49 extends laterally from extension 45. A link 46 is pivotally mounted on the upper end of the extension 45. The other end of the link 46 is pivotally connected to a rod 47 which in turn is pivoted to the bracket 43 on the transverse member 23. Preferably one end of the rod 47 is bent at right angles as at 48 (see Figure 1), to form a handle.

When the mower is in its usual condition, that is, when it is in use for mowing, the link 46 and rod 47 will be approximately in the positions shown in Figure 2, which will permit the cutter frame to move up and down relative to the main frame. When it is desired to lift the cutter frame from the ground, the handle 48 can be grasped and pulled upwardly and toward the rear, swinging the link 46 about its pivotal connection with the arm 44 until the link 46 strikes the abutment 49 where the link 46 is brought to rest. It will be evident that when the handle reaches this position the rod 47 has moved past the dead center of the pivot connection between extension 45 and link 46. The link 46 then cannot move counterclockwise as viewed in Figure 2. Clockwise movement is prevented by engagement of link 46 with abutment 49. The frame of the cutter is thus held well clear of the ground.

The motor 12 may be of any suitable type of prime mover, such as a gasoline internal combustion engine or an electric motor, preferably the former. The motor is provided with a power take off shaft 50 having a pair of axially spaced pulleys 51 and 52 keyed thereon. One of the pulleys drives the traction wheels and the other pulley drives the rotary cutter on the cutter frame, as will more fully appear presently.

The drive for the traction wheels comprises a belt 53, a pulley 54 on a jack shaft 55, a sprocket 56, a chain 57, and a sprocket 58. The jack shaft 55 is rotatably mounted in bearings 59 in the upper end of a lever 60. The lever 60 is pivotally connected at its lower end by means of a pin 61 to a bracket 62 rigidly connected to the main frame. The pulley 54 is keyed to the left hand end of the jack shaft 55 and the sprocket 56 is keyed to the right hand end of the jack shaft. The jack shaft can be moved forwardly and rearwardly through the swinging action of the lever 60 about its pivot 61 to loosen and tighten the belt 53 connecting the pulleys 51 and 54. The means for tightening the belt will be more fully described later.

The chain 57 runs over the sprocket 56 and sprocket 58 which is fixedly attached to the axle on the traction wheels. The chain is kept tight by means of an idler sprocket 63 on an arm 64 which rotates on the jack shaft 55. A spring 65 connected at one end of the arm 64 and at the other to the main frame pulls the idler sprocket 63 downwardly and keeps tension in the chain 57.

The drive for the rotary cutter comprises a belt 66, a pulley 67, a jack shaft 68, a sprocket 69, a chain 70, and the aforementioned sprockets 28 and 40.

The jack shaft 68 is rotatably mounted in bearings in the upper end of a lever 71. The lower end of the lever 71 is pivotally mounted by a pin 72 in a bracket 73 on the main frame. The pulley 67 and sprocket 69 are keyed on the jack shaft 68. The belt 66 runs over the pulley 67 and over pulley 52. The tension of the belt 66 may be adjusted by swinging the lever 71 about its pivot 72 by control means which will be described presently. Chain 70 runs over the sprockets 28, 40 and 69. The chain is kept taut by means of an idler sprocket 74 on the end of an arm 75. The other end of the arm is pivotally mounted on jack shaft 68. A coil spring 76 connected at one end to the arm 75 and at the other end to the main frame maintains tension in the chain 70.

Figure 4:
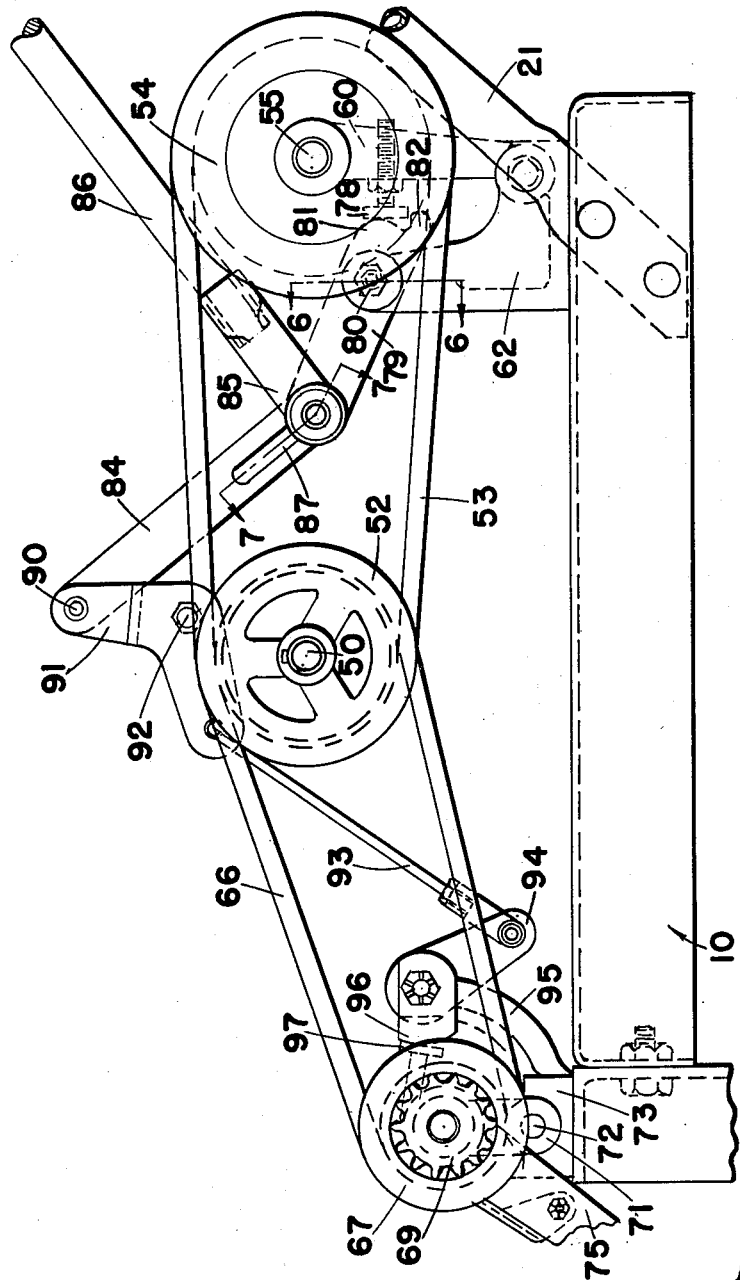
Figure 4 is a fragmentary side elevational view of the control mechanism for the rotary cutter and traction wheels.

The mechanism for connecting and disconnecting the drives between the power take off shaft 50 and the traction wheels and the power take off shaft and the rotary cutter is shown best in Figure 4. A cam follower 78 which is made in the form of a bolt, is threaded into the lever 60. A cam 79 is pivotally mounted by means of a pin 80 on the upper end of the bracket 62. The rear end of the cam 79 has a curved cam surface 81 which engages the cam follower 78. A stop 82, which is arranged so as to strike the bottom of the cam follower, and prevent movement of the cam counterclockwise from its position shown in Figure 4, is provided at the rear of the cam. The other end of the cam 79 is connected by a pin 83 to a link 84 and also to the two arms of a clevis 85. The clevis is rigidly connected to a control bar 86.

The link 84, at the end connected to the cam 79, is provided with a slot 87. The lower end of the slot has an enlargement 88 which receives the head of a bushing 89. The diameter of the head of the bushing is greater than that of the width of the slot 87. The other end of the bushing 89 is of reduced diameter and fits relatively snugly in the opening in the cam 79. A compression spring 100 surrounds pin 83 between one arm of clevis 85 and cam 79.

The other end of the link 84 is pivoted at 90 to one arm of a bell crank 91. The bell crank 91 is pivoted at 92 intermediate its ends on a suitable support, such as the block of the motor 12. The other end of the bell crank is pivotally connected to one end of a link 93, which link in turn is pivotally connected at its other end to a lever 94. The latter is pivoted at the lower end remote from the link 93 on extension of bracket 73. The lever 94 has a cam 96 rigidly attached thereto. The curved edge of the cam engages a cam follower 97 which may be similar to cam follower 78. Cam follower 97 is threaded into the lever 71.

The handle 21 supports a control lever 99. The latter is pivoted at its lower end on the handle and the upper end of control bar 86 is pivotally connected to the control lever intermediate its ends.

When the parts of the power mower are in the position shown in Figures 1 to 4 and the engine 12 is operating, the mower will be driven forward over the ground and the rotary cutter will operate to cut grass. Any undulations in the ground will be followed by the cutter frame since the arms 37 permit the cutter frame to move up and down and twist slightly laterally for this purpose.

If it is desired to stop the drive to the traction wheels while keeping the cutter rotating, so as to permit the use of the mower in relatively close quarters, the control lever 99 can be pulled toward the operator or in a clockwise direction, as viewed in Figure 4, a limited distance to the position shown in dotted lines at A in Figure 2. This will swing the cam 79 in a clockwise direction, as viewed in Figure 4, and release the tension on the belt 53. The belt will then slip relatively to one or both of the pulleys 51 or 54 and permit the traction wheels to stop. The drive to the rotary cutter will not be affected.

To stop the cutter from rotating, it is only necessary to continue the rotation of the control lever 99 toward the operator a still further distance to the dotted line position B. The bar 86 will then pull the link 84 so as to produce a clockwise rotation of bell crank 91 and thereby move the cam 96 relative to cam follower 97 a sufficient distance to slacken the belt 66, thus stopping the cutter from rotating. A reverse movement of the control lever 99 will first effect the drive to the rotary cutter and then the drive to the traction wheels.

It will be noted that only with this control system it is impossible to drive the traction wheels without driving the rotary cutter. If it is desired to transport the mower by means of the traction wheels without operating the rotary cutter, the connection between the rod 86 and link 84 can be changed. To effect this, the control lever 99 is pulled so that both belts 53 and 66 are slackened. Then, the operator can grasp the link 84 and pull it toward the left side of the mower. This will move the clevis 85 toward the left side of the mower against the tension of the spring 100 and will slip the link 84 off of the head of the bushing 89. The link 84 can then slide relative to the pin 83 because the pin is of less diameter than the slot 87. The control lever can then be forced forwardly and downwardly, tightening the belt 53 in the manner heretofore described. There is no effect, however, upon the tension in the belt 66 which is slack because the pin 83 rides freely in the slot 87 and will not pull the bell crank 91 in a clockwise direction to tighten the belt 66.

When it is desired to again connect the drive to the cutter, all that is necessary to do is to pull the control lever 99 as far back as it will go and the spring 100 will pull the clevis and link 84 back toward the right hand side of the mower and reengage the head of the bushing 89 in the enlargement of the slot in the link.

From the foregoing it will be seen that the present invention provides a simple mechanism for driving both the traction wheels and the rotary cutter of a power lawn mower while at the same time permitting either one or both of the rotary cutter and traction wheels to be driven. The invention also provides an effective means for raising the cutter frame and holding it in raised position relative to the main frame when it is desired to transport the mower without doing any cutting.

The scope of the invention is indicated in the appended claims.

I claim:

1. In a power driven lawn mower, a main frame, traction wheels therefor, a cutter frame having a rotary cutter therein, means pivotally connecting said cutter frame to said main frame, a motor on said main frame, said motor having a power take-off shaft, a driving connection between said power take-off shaft and said traction wheels, said driving connection including a jack shaft and a belt connecting said power take-off shaft and said jack shaft, a driving connection between said power take-off shaft and said rotary cutter, said last named driving connection including a second jack shaft and a belt connecting the latter and said power take-off shaft, and means for moving said jack shafts toward and away from said power take off shaft to disengage and engage said driving connections respectively.

2. A power driven lawn mower as defined in claim 1 wherein the means for moving said jack shafts comprises a pair of cams pivotally mounted on said main frame.

3. A power driven lawn mower as defined in claim 1 wherein the means for moving said jack shafts comprises a pair of cams pivotally mounted on said main frame, and linkage mechanism connecting said cams together, said linkage mechanism being so constructed and arranged that actuation thereof moves said cams in sequence.

4. In a power driven lawn mower, a main frame, traction wheels therefor, a cutter frame having a rotary cutter therein, means pivotally connecting said cutter frame to said main frame, a motor on said main frame, said motor having a power take-off shaft, a driving connection between said power take-off shaft and said traction wheels, a driving connection between said power take-off shaft and said rotary cutter, and means associated with said driving connections for successively disengaging the latter, said means comprising a pair of cams pivotally mounted on said main frame and a pair of pivoted links connecting said cams together, one of said links having a slot therein and the other link having a pin slidable therein, and means for locking said pin against sliding movement in said slot.

5. In a power driven lawn mower, a main frame, traction wheels therefor, a cutter frame having a rotary cutter therein, means pivotally connecting said cutter frame to said main frame, a motor on said main frame, said motor having a power take-off shaft, a first lever pivotally connected at one end to said main frame, a wheel driving shaft rotatably mounted in the other end of said lever, drive means including a belt connecting said power take-off shaft and said wheel driving shaft, drive means connecting said wheel driving shaft to said traction wheels, a second lever pivotally connected at one end to said main frame, a cutter driving shaft rotatably mounted in the other end of said lever, drive means including a belt connecting said power take-off shaft to said cutter driving shaft, drive means connecting said cutter driving shaft to said cutter, and means for swinging said levers about their pivotal connections with the main frame toward and away from said power take off shaft whereby to tighten and loosen said belts.

6. A power driven lawn mower as defined in claim 5 wherein the means for swinging said levers comprises a pair of cams pivotally mounted on said main frame.

7. A power driven lawn mower as defined in claim 5 wherein the means for swinging said levers comprises a pair of cams pivotally mounted on said main frame, and links connecting said cams whereby said cams may be operated in sequence.

8. A power driven lawn mower as defined in claim 5 wherein the means for swinging said levers comprises a pair of cams pivotally mounted on said main frame, and link means connecting said cams together, the connection between said link means and one of said cams being disengageable.

9. In a power driven lawn mower, a main frame, traction wheels therefor, a cutter frame having a rotary cutter therein, means pivotally connecting said cutter frame to said main frame, a motor on said main frame, a driving connection between said motor and said traction wheels, a driving connection between said motor and said rotary cutter, a cam associated with said first named driving connection for disengaging the latter, a second cam associated with said second named driving connection for disengaging the same, and means including links connecting said cams together to successively actuate the latter.

ROBERT E. BRADLEY.

REFERENCES CITED

The following references are of record in the file of this patent:

UNITED STATES PATENTS

| Number | Name | Date |
|---|---|---|
| 1,240,561 | Gore | Sept. 18, 1917 |
| 1,261,571 | McDaniels | Apr. 2, 1918 |
| 1,296,577 | Weber | Mar. 4, 1919 |
| 1,551,543 | Coldwell | Sept. 1, 1925 |
| 2,010,288 | Bartelme | Aug. 6, 1935 |
| 2,145,467 | Waddell | Jan. 31, 1939 |
| 2,204,254 | Moyer | June 11, 1940 |
| 2,247,333 | Funk | June 24, 1941 |
| 2,329,952 | Speiser | Sept. 21, 1943 |
| 2,367,267 | Dawson | Jan. 16, 1945 |